United States Patent
Pitcher et al.

(10) Patent No.: US 6,370,142 B1
(45) Date of Patent: *Apr. 9, 2002

(54) METHOD AND APPARATUS FOR PERFORMING PER-PORT IP MULTICAST PRUNING

(75) Inventors: Derek Pitcher, Newark; Kishore K. Seshadri, Redwood City; Daniel A. Simone, Mountain View, all of CA (US)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/832,042
(22) Filed: Apr. 2, 1997

Related U.S. Application Data

(63) Continuation-in-part of application No. 08/501,483, filed on Jul. 12, 1995.

(51) Int. Cl.[7] .............................. H04L 12/28; H04J 3/26
(52) U.S. Cl. ...................... 370/390; 370/401; 370/432
(58) Field of Search .................................. 370/352, 353, 370/354, 389, 390, 395, 396, 397, 400, 392, 407, 409, 428, 429, 412, 432, 360, 363, 402, 410; 709/223, 224, 225, 220, 249

(56) References Cited

U.S. PATENT DOCUMENTS

| | | | |
|---|---|---|---|
| 5,331,637 A | 7/1994 | Francis et al. ................. | 370/54 |
| 5,355,375 A | 10/1994 | Christensen ............... | 370/85.2 |
| 5,361,256 A | * 11/1994 | Doeringer et al. ............ | 370/60 |
| 5,396,493 A | 3/1995 | Sugiyama .................... | 370/60 |

(List continued on next page.)

FOREIGN PATENT DOCUMENTS

WO    WO 95/01023    1/1995

OTHER PUBLICATIONS

Pustateri, T., "IP Multicast over Token–Ring Local Area Networks", RFC–1469, Jun. 1993.

Katz, D., "A Proposed Standard for the Transmission of IP Datagrams over FDDI Networks", RFC 1188, Oct. 1990.

(List continued on next page.)

*Primary Examiner*—Ajit Patel
*Assistant Examiner*—Hanh Nguyen
(74) *Attorney, Agent, or Firm*—Blakely Sokoloff Taylor & Zafman LLP

(57) ABSTRACT

A method and apparatus for performing per-port Internet Protocol (IP) multicast pruning, proxying of IP multicast group membership reports, and generating pseudo membership queries for determining IP multicast group membership are provided. A switch may implement per-port IP multicast pruning by establishing a mapping of IP multicast groups to its ports. The mapping is based upon membership reports received from each end-station participating in an IP multicast group. Based upon the mapping, the switch forwards IP multicast packets only to those of the end-stations that are participating in the IP multicast group addressed. Once per-port IP multicast pruning is implemented, multicast routers must process membership reports from all end-stations participating in an IP multicast group. To reduce this burden, a switch may act as a proxy device. The switch receives a membership report identifying an IP multicast group. If the membership report is the first received for the IP multicast group after a membership query, then the switch forwards the membership report. However, if the membership report is not the first received, then the switch discards the membership report. To allow IP multicast group membership determination when no querier is present, a switch determines if another device is currently acting as a querier for a switched network. If not, the switch sends a membership query on one or more of its ports. Responsive to the membership query, an end-station transmits a membership report to the switch. The switch records the IP multicast group membership indicated in the membership report.

11 Claims, 10 Drawing Sheets

U.S. PATENT DOCUMENTS

| | | | | |
|---|---|---|---|---|
| 5,400,326 A | * | 3/1995 | Smith | 370/61 |
| 5,428,615 A | | 6/1995 | Backes et al. | 370/85.13 |
| 5,448,565 A | | 9/1995 | Chang et al. | 370/85.13 |
| 5,481,540 A | | 1/1996 | Huang | 370/85.13 |
| 5,517,494 A | * | 5/1996 | Green | 370/60 |
| 5,608,726 A | | 3/1997 | Virgile | 370/401 |
| 5,664,091 A | | 9/1997 | Keen | 395/182.16 |
| 5,737,334 A | * | 4/1998 | Prince et al. | 370/395 |
| 5,781,549 A | * | 7/1998 | Dai | 370/398 |
| 5,818,838 A | * | 10/1998 | Backes et al. | 370/390 |
| 5,852,606 A | * | 12/1998 | Prince et al. | 370/393 |
| 5,898,686 A | * | 4/1999 | Virgile | 370/401 |
| 5,968,126 A | * | 10/1999 | Ekstrom et al. | 370/409 |
| 6,023,563 A | * | 2/2000 | Shani | 370/401 |
| 6,075,776 A | * | 6/2000 | Tanimoto et al. | 370/254 |
| 6,111,876 A | * | 8/2000 | Frantz et al. | 370/392 |

OTHER PUBLICATIONS

Stephen E. Deering, "Multicast Routing In Internetworks And Extended LANs", ACM Symposium On Communications Architectures And Protocols, ACM Sigcomm, Aug. 1998, pp. 55–64.

Cisco Systems, Inc., "IP Multicast Streamlines Delivery Of Multicast Applications", Packet™ Magazine Arhcive, First Quarter 1995, downloaded from Web Site http://www.cisco.com/warp/public/674/4.html, 6 pages.

D. R. Cheriton, S. E. Deering, "Host Groups: A Multicast Extension For Datagram Internetworks", Ninth Data Communications Symposium, Sep. 1985, pp. 172–179.

"Introduction to IP Multicast Routing", An IP Multicast Initiative White Paper, Stardust Technologies, Inc., 1995–1997, pp. 1–15.

"Higher Level Protocols Used With IP Multicast", An IP Multicast Initiative White Paper, Stardust Technologies, Inc., 1995–1997.

"Layer–3 Virtual LANs: The Only VLAN Implementataion To Deliver On the Full Promise Of Switched Internetworking", A White Paper, Agile Networks, 1996, pp. 1–13.

"Internet Group Management Protocol, Version 2", W. Fenner, Internet–Draft, Internet Engineering Task Force Inter–Domain Multicast Routing Working Group, pp. 1–22.

"Host Extensions For IP Multicasting", S. Deering, Network Working Group, pp. 1–16.

"Foundry Products", downloaded from Website http://www.foundrynet.com/.

"Deploying IP Multicast Applications on Switched–Based Networks", A White Paper, Agile Networks, Inc., 1996, pp. 1–12.

"How IP Multicast Works" An IP Multicast Initiative White Paper, Stardust Technologies, Inc., 1995–1997, pp. 1–12.

"IP Multicast Backgrounder" An IP Multicast Initiative White Paper, Stardust Technologies, Inc., 1995–1997, pp. 1–9.

* cited by examiner

| DESTINATION MASK 1010 | PRIORITY 1014 | DESTINATION VPI/VCI 1016 |
|---|---|---|
| SOURCE STRIP/INSERT CONTROL 1018 | | DESTINATION STRIP/INSERT CONTROL 1020 |

1000

METHOD AND APPARATUS FOR PERFORMING PER-PORT IP MULTICAST PRUNING

RELATED APPLICATIONS

This application is a continuation-in-part of copending U.S. patent application, Ser. No. 08/501,483 filed Jul. 12, 1995, by H. Earl Ferguson, et al., and titled "METHOD AND APPARATUS FOR CONTROLLING DATA FLOW WITHIN A SWITCHING DEVICE."

FIELD OF THE INVENTION

The invention relates generally to the field of switched networks and Internet Protocol (IP) multicast forwarding. More specifically, the invention relates to pruning IP multicast traffic within an IP subnet and the determination of IP multicast group memberships in a switched network.

BACKGROUND OF THE INVENTION

Multicast is the transmission of information to a group of recipients (e.g., a multicast group) via a single transmission by the source. A protocol used to support membership registration for IP multicast traffic is Internet Group Management Protocol (IGMP). IGMP is used by end-stations in networks to communicate the addresses of IP multicast groups in which the end-stations would like to participate. Using this multicast group membership information from IGMP, routers carry out multicast pruning. Multicast packets are transmitted in such a way that only subnets with members (learned through IGMP) receive the appropriate multicast traffic. Further, multicast packets are forwarded in such a way that there is no "looping" of packets in the network. Loops are avoided within subnets by using a spanning tree algorithm and across subnets through the use of a multicast routing protocol. This prior method of multicast pruning performed by IGMP routers will be discussed further with reference to FIG. 2.

Brief Overview of Internet Group Management Protocol (IGMP)

IGMP messages have an eight octet format including a type field and a group address field. IGMP messages are encapsulated in IP Datagrams using an IP protocol number of two. Three types of IGMP messages are exchanged between IP hosts and multicast routers: membership query messages, membership report messages, and leave group messages. As illustrated by FIG. 1A, membership query messages (represented with solid arrows) are used by multicast routers (e.g., router 110) to learn which IP multicast groups have members on a particular attached network. The membership query messages are forwarded to each connected interface by intermediate switches 120. IP hosts 130 respond to membership query messages with membership reports (represented with dashed arrows) which identify a multicast group in which the reporting IP host is participating. IP hosts 130 can also send unsolicited membership reports when they wish to join a multicast group. Further, leave group messages (not shown) may be sent by IP hosts when they no longer wish to participate in a particular multicast group.

As illustrated by FIG. 1B, the IGMP protocol 145 runs on router 110. The IGMP protocol periodically generates IGMP membership queries using a set of timers 150. Based upon the IGMP membership reports received from each attached network, multicast routers track IP multicast group membership represented on a given port by maintaining a multicast groups table 155. Multicast routers maintain lists of multicast group memberships for each attached network and a timer for each group membership. When a multicast packet is received by a multicast router, the multicast group membership information is used to eliminate branches that do not lead to members of the multicast group to which the multicast packet is addressed.

With respect to a given attached network, a multicast router may assume the role of an IGMP querier or a non-querier. At start up, a multicast router assumes it is the IGMP querier for each attached network. However, if a multicast router hears a query message from another router with a lower IP address, it will become a non-querier for that network. This querier election mechanism prevents more than one multicast router from being a querier for a given network. Further details about this protocol are available in Fenner, W., "Internet Group Management Protocol, Version 2," INTERNET-DRAFT, Xerox PARC, May 20, 1996 and also in S. Deering, Request for Comments 1112, "Host Extensions for IP Multicasting," August 1989.

FIG. 2 illustrates the pruning of subnets for a multicast message in a routed network in which one or more end-stations reside on switched subnetworks. The routed network includes routers 201 through 205, Layer 2 switches 250 through 254, and endstations 231 through 244. Routers 201 through 205 are multicast routers running IGMP or an equivalent group management protocol to discover the IP multicast group memberships of each attached network. Switches 250 through 254 represent switches employing current forwarding logic. Such a switch 120 is illustrated in FIG. 1C. The switch 120 includes a forwarding engine 160. The forwarding engine 160 has no forwarding rules (forwarding logic) for IP multicast traffic. Thus, when the switch 120 receives a packet with an IP multicast address, the address is mapped to a medium dependent broadcast address such as an Ethernet broadcast address and processed using the associated broadcast forwarding logic. Therefore, in the present example, since the forwarding engine 160 has no knowledge of which ports lead to end-stations participating in IP multicast groups, upon receiving an IP multicast packet, the forwarding engine 160 must forward the packet to each of its connected interfaces. This forwarding behavior is currently required to assure that all end-stations listening for the IP multicast group addressed by the packet will receive the packet.

In this example, end-stations 231 through 244 are all members of either the white multicast group or the black multicast group represented with hollow or solid circles, respectively. Assuming a multicast message addressed to the black multicast group is originated at end-station 240, the thick lines represent the network segments upon which the multicast message will be forwarded. For example, the multicast message will be forwarded from router 203 to routers 202 and 205. However, the multicast message will not be forwarded from router 203 to router 204 as no black multicast group members exist on this network segment. While this prior method of pruning is sufficient to eliminate multicast traffic on the network segment connecting router 203 and router 204, it is limited to pruning at a network level.

A disadvantage of this prior approach is switches 120 forward IP multicast packets to all of their ports regardless of the IP multicast groups represented on a given port. Therefore, non-multicast group members residing on a network segment with one or more IP multicast group members wind up having to process and filter packets to destination addresses in which they have no interest. For example, this prior approach forces endstations 234 and 236 to process and filter IP multicast messages intended for end-stations 233 and 235. Also, end-stations 237, 239, 240, 241, and 242 are interrupted by IP multicast messages intended for end-station 238. Having to process these undesired packets takes up valuable resources at the end-station. In addition, bandwidth on the link is wasted.

Based on the foregoing, it is desirable to further confine IP multicast traffic such that multicast packets addressed to a particular multicast group address do not propagate into portions of a switched network in which no end-stations are listening for the particular multicast group address. Specifically, it is desirable to carry out IP multicast pruning on a per-port basis within a switch to eliminate the exposure of multicast traffic to end-stations not participating in a multicast group. Further, it is desirable to reduce the number of group membership reports that must be processed by a querying device by providing a group membership report proxy feature which allows a switch to act as a proxy device for group membership reports. In addition, it is desirable to provide the ability to perform multicast pruning on a per-port basis within a switch when no multicast routers are present on the network or when multicast is otherwise disabled on the router. Finally, rather than pursuing a proprietary solution for determining per-port multicast group membership within a switch, it is desirable to utilize existing multicast group reporting mechanisms such as those employed by IGMP compliant hosts and routers.

SUMMARY OF THE INVENTION

A method and apparatus is described for performing per-port IP multicast pruning and generation of pseudo membership queries for determining IP multicast group membership in a switched network. According to one aspect of the present invention, a switch is coupled to one or more end-stations. When the switch receives an Internet Protocol (IP) multicast packet addressed to a particular IP multicast group, the switch forwards the packet only to those of the end-stations that are participating in the IP multicast group, thereby eliminating the exposure of multicast traffic to end-stations not participating in the IP multicast group. Advantageously, switches implementing per-port IP multicast pruning no longer burden non-multicast group members with packets in which they have no interest. In addition, bandwidth is conserved on the link to the end-station.

According to another aspect of the present invention, IP multicast group membership can be solicited from end-stations residing on a given switched network in the absence of a multicast router. The switch first determines if another device is currently acting as a querier for the switched network. If no device is currently acting as the querier for the switched network, the switch originates a multicast group membership query and transmits the multicast group membership query onto one or more of its ports.

According to yet another aspect of the present invention, the IP multicast group memberships in a switched network can be determined. First, a switch determines if another device is currently acting as a querier for the switched network. If no device is currently acting as a querier for the switched network, the switch sends a multicast group membership query on one or more of its ports. In response to the multicast group membership query, an end-station transmits a multicast group membership report to the switch. The multicast group membership report indicates the IP multicast group membership of the end-station. The switch records the IP multicast group membership of the end-station. In this manner, IP multicast pruning can be performed on a per-port basis within a switch even when no multicast routers are present on the network or when multicast is otherwise disabled.

Other features of the present invention will be apparent from the accompanying drawings and from the detailed description which follows.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for performing per-port IP multicast pruning and generation of pseudo membership queries for determining IP multicast group membership in a switched network is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps, which will be described below. The steps can be embodied in machineexecutable instructions, which can be used to cause a general-purpose or special-purpose processor programmed with the instructions to perform the steps. Alternatively, the steps of the present invention might be performed by specific hardware components that contain hardwired logic for performing the steps, or by any combination of programmed computer components and custom hardware components.

Importantly, while several embodiments of the present invention will now be described with respect to IGMP, those of ordinary skill in the art will appreciate that the present invention is not limited to any particular protocol for discovering IP multicast groups. For example, the method and apparatus of the present invention are not limited to networks employing IGMP to discover IP multicast group membership. Rather, the disclosed method and apparatus is useful in connection with any group management protocol that discovers IP multicast group membership by way of a query-response mechanism.

Per-Port Pruning in a Switched Network

Figure 2:
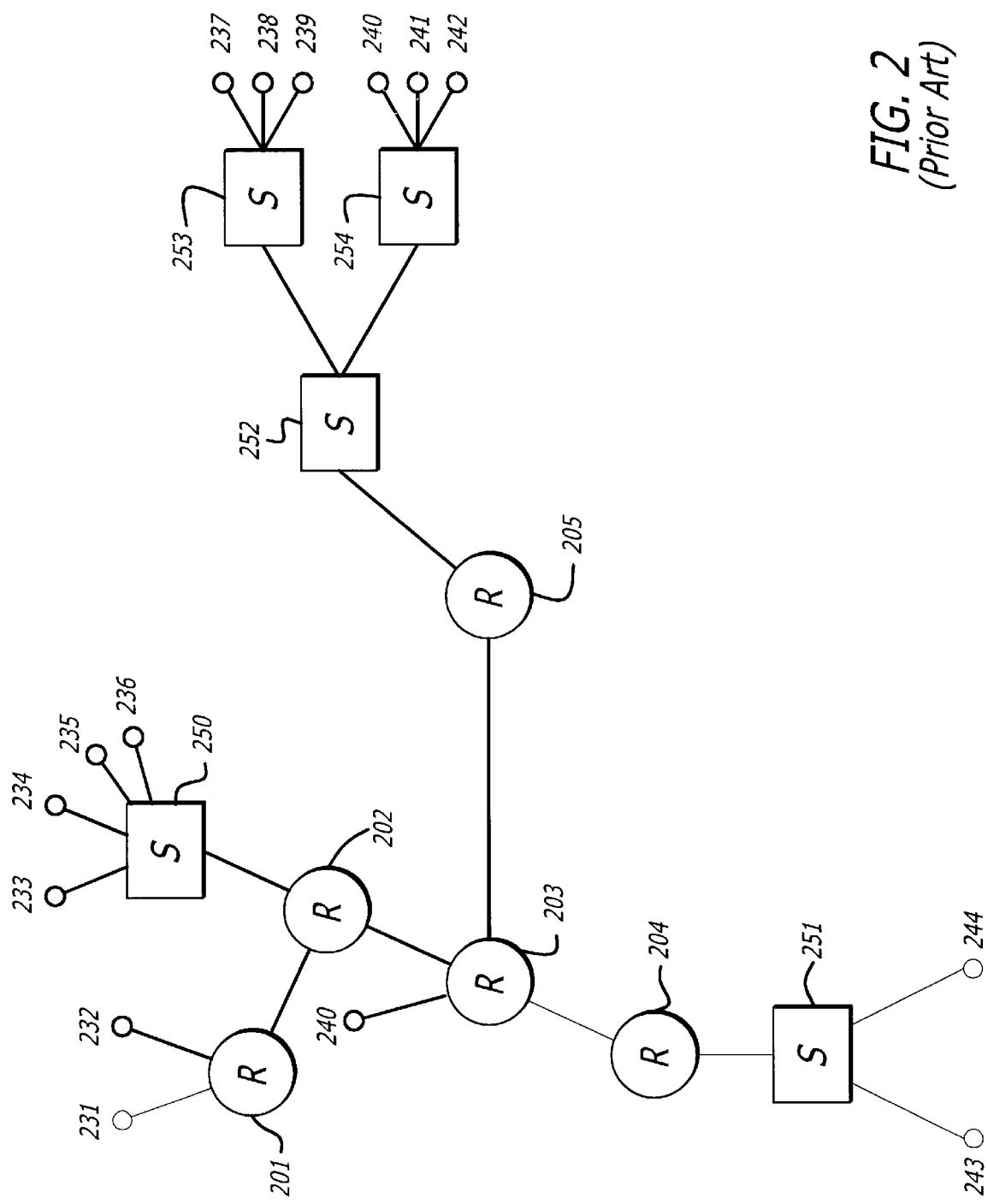
FIG. 2 illustrates a prior approach to the pruning of subnets for a multicast message in a routed network in which one or more end-stations reside on switched subnetworks.

As can be appreciated with respect to FIG. 2, the current level of pruning provided by multicast routers is insufficient to prevent end-stations in switched networks from having to process and filter many packets to destination addresses in which they have no interest. In current implementations, as illustrated by FIG. 2, pruning is only carried out to the subnet level, rather than to the end-station level.

According to one aspect of the present invention, switches utilize the host reporting mechanism for group management protocols such as IGMP to learn IP multicast group membership for each of their ports. Once this group membership information is known, the forwarding of multicast messages can be limited to only those ports having a member of the multicast group being addressed. In this manner, multicast traffic destined for a particular group will be excluded from network segments that include no members of the multicast group.

Figure 4:
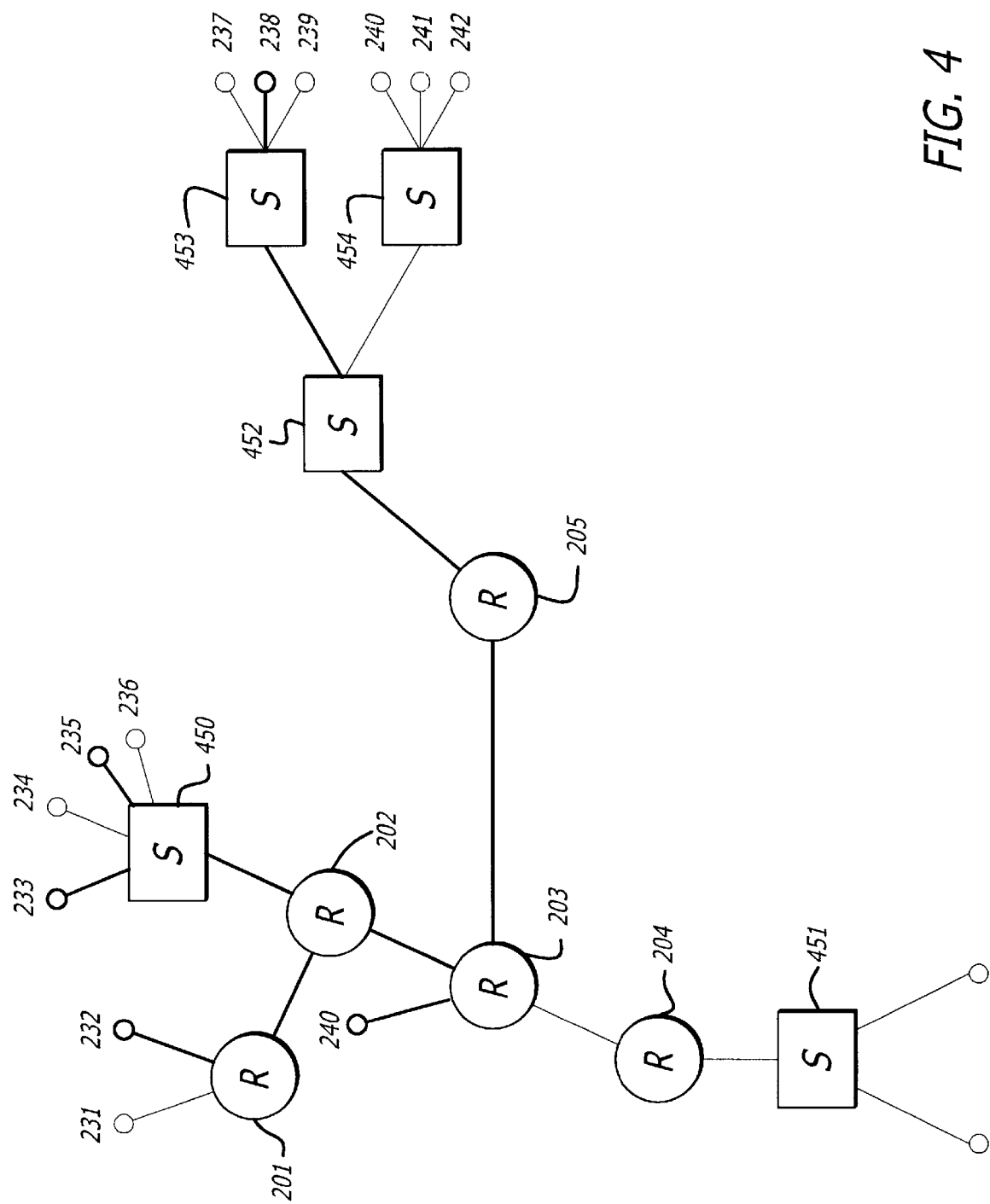
FIG. 4 illustrates the significance of employing per-port pruning when forwarding a multicast message in switched subnetworks according to one embodiment of the present invention.
Figure 5:
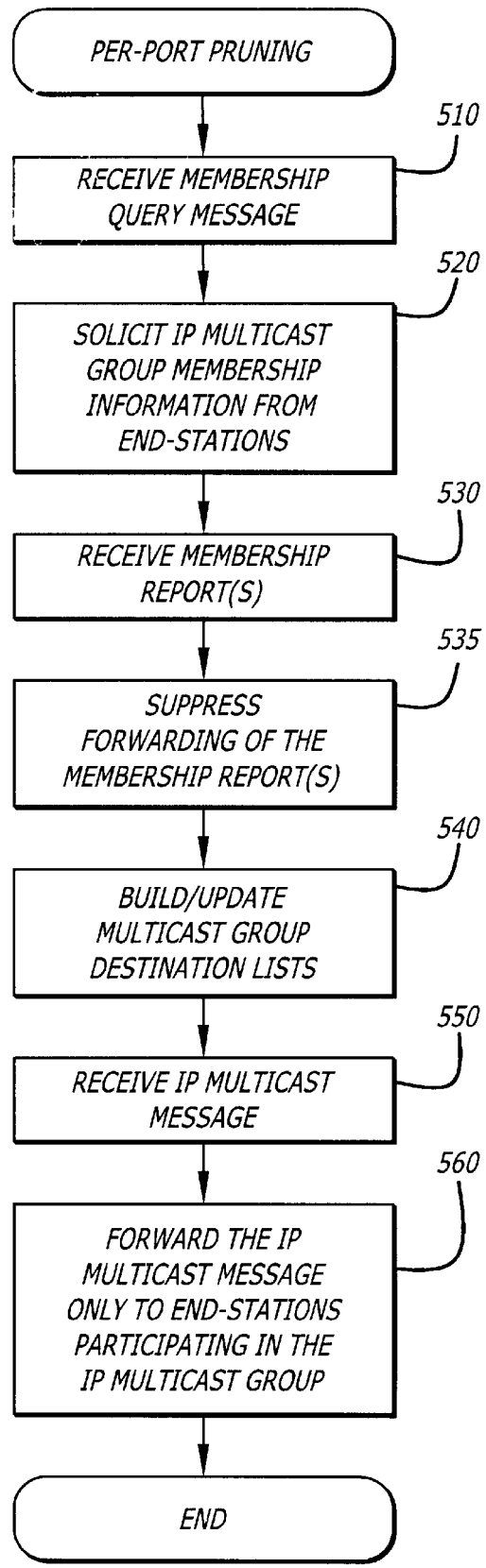
FIG. 5 is a flow diagram illustrating a method of performing per-port multicast pruning in a switched network according to one embodiment of the present invention.

FIG. 4 is useful for illustrating the significance of employing per-port pruning in a switched network. As in FIG. 2, the network includes multicast routers 201 through 205 and end-stations 231 through 244. However, switches 250 through 254 have been replaced by Layer 2 switches 450 through 454 which are capable of per-port IP multicast pruning. Advantageously, switches implementing per-port IP multicast pruning no longer burden non-multicast group members with packets in which they have no interest. For example, since switch 450 maintains a local mapping of IP multicast groups to ports, multicast packets addressed to the black multicast group are no longer transmitted to end-stations 234 and 236. Similarly, multicast packets addressed to the black multicast group are no longer forwarded to end-stations 237 and 239 by switch 453 and switch 454 no longer forwards black multicast group messages to end-stations 240, 241, and 242. One advantage, therefore, of providing per-port pruning in a switch is the preservation of valuable end-station processing. For example, end-station processing is not consumed filtering "wrong addresses." In addition, link bandwidth is not needlessly wasted transmitting multicast packets that will simply be dropped by the end-station at the other end of the link FIG. 5 is a flow diagram illustrating a method of performing per-port IP multicast pruning in a switched network according to one embodiment of the present invention. To get a complete view of the multicast group memberships on the subnet, it is important that the switch receive IGMP membership reports from each end-station that is participating in an IP multicast group.

At this point, it is instructive to point out that the host portion of IGMP, in order to avoid duplicate membership reports, causes an end-station to suppress its IGMP membership report if it hears another IGMP membership report for an IP multicast group in which it is participating. Each end-station waits for a random time interval before responding to an IGMP membership query. If while waiting, an end-station sees an IGMP membership report from another end-station for the same IP multicast group, then the end-station will not generate an IGMP membership report. Therefore, as will be explained further with respect to step 535, to be sure that each end-station generates an IGMP membership report for each IP multicast group in which it is interested, the switch needs to create the illusion that the end-station is the only system on the subnet interested in participating in that IP multicast group.

At step 510, an IGMP membership query is received by the switch. The IGMP membership query might have been originated by a querying multicast router or, according to another aspect of the present invention the IGMP membership query might have been originated by another switch. The latter possibility will become apparent after the discussion of pseudo-IGMP query generation.

At step 520, multicast group membership information is solicited from end-stations by forwarding the IGMP membership query to each end-station on the subnet.

At step 530, IGMP membership reports are received from end-stations that are participating in multicast groups.

As discussed above, at step 535, the switch suppresses forwarding the IGMP membership reports to other end-stations on the same subnet. In this manner, it appears to the host portion of IGMP running on each end-station that it is the only system reporting for the multicast groups in which it is participating. Since no end-station will hear reports corresponding to the multicast groups in which it is participating, each end-station that is participating in a multicast group is forced to respond to the IGMP membership query with an IGMP membership report. IGMP membership report forwarding by the switch will be discussed further below with respect to proxying of IGMP membership reports.

At step 540, multicast group destination lists are modified based upon the IGMP membership reports received in step 530. After an IGMP membership report is received, the switch records the IP multicast group membership of the end-station and the port on the switch to which the end-station is attached. The creation and subsequent maintenance of multicast group destination lists is discussed further below.

At step 550, a multicast message is received by the switch.

At step 560, the switch forwards the multicast message to a set of ports that includes only those end-stations that are participating in the multicast group addressed by the message. For example, the message can be forwarded based upon an appropriate multicast group destination list.

Destination List Management

A destination list can be thought of conceptually as a list of ports to which packets directed to the destination list are to be forwarded. Destination lists can be stored as entries in a data structure such as a table (e.g., a two dimensional array) or other suitable data structure such as a sorted linked list, or a search tree. Preferably, destination lists are maintained for forwarding membership reports for a particular virtual local area network (VLAN), for VLAN forwarding, and for forwarding IP multicast packets to each IP multicast group represented in a particular VLAN. Alternatively, to save memory, one or more of the destination lists can span VLANs. While one approach to the creation and maintenance of each of these destination lists will now briefly be discussed, it will be recognized that numerous other ways are possible.

The report destination list includes the ports having either a querier or a non-querier router. Discovery of querier and non-querier routers can be performed manually or automatically. Manual discovery occurs as a result of a user or network administrator specifying ports containing routers such as non-querier routers during switch configuration, for example. The switch can, then access the manually entered information to update the report destination list. Automatic discovery occurs as a result of the switch detecting router queries by snooping or listening to multicast traffic. The report destination list is created upon VLAN creation. As group membership queries are received from routers, the receiving port is added to the report destination list. If a group membership query is not received from a given port within a predetermined amount of time such as the Other__Querier__Present timer, the port is removed from the report destination list. The Other__Querier__Present timer is the length of time which must pass before a determination can be made by IGMP as to whether or not a querier device such as a multicast router is present. Alternatively, a single timer can be maintained for the report destination list. When a single timer is used, rather than removing a particular port, all ports are removed from the report destination list. Importantly, however, manually configured ports should not be timed-out.

The VLAN destination list contain all ports that are members of a particular VLAN.

In one embodiment, a forwarding table is maintained per VLAN which includes a multicast group destination list for each IP multicast group within the particular VLAN supporting multicasting. The forwarding table can be indexed by a function of the multicast group address using a hash function, for example. Preferably, each multicast group destination list should contain all ports having members of the particular IP multicast group and all router ports. However, as will be discussed further below, in certain situations routers need not be members of every IP multicast group.

Alternatively, the tables storing the destination lists can be indexed by "Destination tags" also referred to as "Dtags" and can be centrally located or distributed throughout the switch. For example, the forwarding table can be separated into two levels, a first level for mapping IP multicast group addresses to group multicast Dtags, and a second level for mapping the Dtags to ports. The forwarding table can be maintained by the switch in a manner similar to the GA-to-Dtag table, discussed below. Destination tags are discussed in detail below with reference to FIGS. 9 through 11.

In any event, multicast group destination lists are created upon user configuration or dynamically based upon receipt of IGMP membership reports and queries. Thereafter, the switch updates the multicast group destination lists based upon IGMP membership reports and port expiration timers. A port report expiration timer is maintained for each multicast group destination list member. When a report is received, the receiving port is added to the appropriate multicast group destination list if it is not already a current member and the corresponding port report timer should be reset. If the port report timer expires, the port is removed from the multicast group destination list. Importantly, any port may contain one or more IP multicast groups, thus any port may be in multiple multicast group destination lists.

Forwarding Logic

Figure 3:
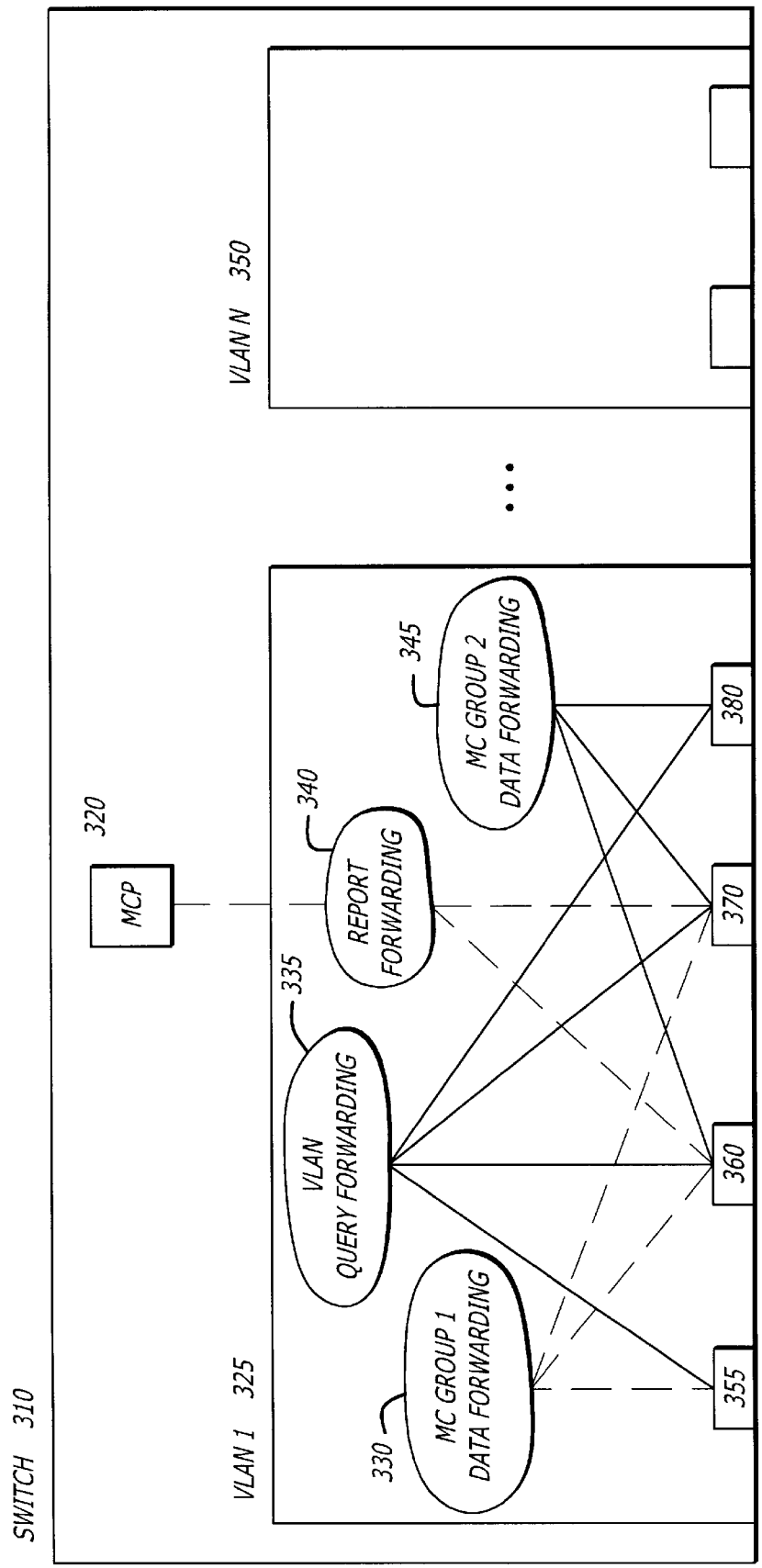
FIG. 3 illustrates switch forwarding logic according to one embodiment of the present invention.

FIG. 3 is a logical view of the switch forwarding logic according to one embodiment of the present invention. Switch 310 can be a switching device such as the Bay Networks Centillion 100 switch. Switch 310 includes a plurality of ports including 355, 360, 370, and 380. The switch 310 also can accommodate one or more virtual local area networks (VLANs) such as VLAN 1 325 and VLAN N 350. The switch also includes a master control process (MCP) also referred to as a "switch manager" 320. The switch manager 320 maintains the destination lists and other tables used for forwarding.

For this example, it is assumed one or more members of IP multicast group 1 are on port 355. Also, one or more members of IP multicast group 2 are assumed to be coupled to port 380. Further, multicast routers are coupled to ports 360 and 370. To assure all members of a particular IP multicast group receive packets addressed to the group, all multicast routers are made members of each IP multicast group. In this manner, a group member across a given router will receive each communication directed to its IP multicast group.

It should be noted that multicast routers need not be made members of each IP multicast group in an environment in which multicast routers advertise their IP group memberships. It should be appreciated, in this situation, that a given multicast router need not be made a member of every IP multicast group, but rather its membership can be limited to the IP multicast groups which are advertised as being across the router.

Bubble 335 depicts the VLAN query forwarding. When IGMP membership queries are received by the switch, they are forwarded onto the VLAN destination list which contains each port participating in a particular VLAN. In this example, ports 355 through 380 are all participating in VLAN 1 325.

The multicast group 1 data forwarding bubble 330, represents the switch's forwarding engine forwarding a multicast packet to the multicast destination list maintained for group 1. IP multicast packets forwarded onto the multicast destination list maintained for group 1 will be forwarded to ports 355, 360, and 370. Since no members of multicast group 1 are coupled to port 380, no multicast packets addressed to group 1 will be forwarded to port 380.

Similarly, the multicast group 2 data forwarding bubble 345 illustrates the result of the switch's forwarding engine forwarding a multicast packet to the multicast destination list maintained for group 2. IP multicast packets forwarded onto the multicast destination list maintained for group 2 will be forwarded to ports 360, 370 and 380. No members of multicast group 2 are coupled to port 355, therefore, no multicast packets addressed to group 2 will be forwarded to port 355.

Bubble 340 depicts the report forwarding logic. Reports are only forwarded to ports coupled to multicast routers (including querying and non-querying routers) or other querying devices such as a switch generating pseudo-IGMP queries. As discussed above, this behavior is what forces each multicast group participant to respond with a report. As will be discussed further with reference to proxying of IGMP membership reports, in one embodiment, all reports are processed by the switch manager 320 prior to being forwarded.

Importantly, this embodiment illustrates that multicast destination lists can be maintained independently of VLANs. Specifically, separate VLANs need not be created for each IP multicast group. Rather, the multicast destination lists may be subsets of destinations within one or more VLANs. In this manner, the network administrator need not be exposed to the administrative complexity of managing additional VLANs. Further advantages will be apparent to those of ordinary skill in the art.

It should be appreciated that the forwarding logic described herein may be implemented in hardware, software or a combination thereof. In any event, software can maintain the tables required by the forwarding logic as described above by listening to membership reports and learning the group memberships of the switch's ports.

Figure 6:
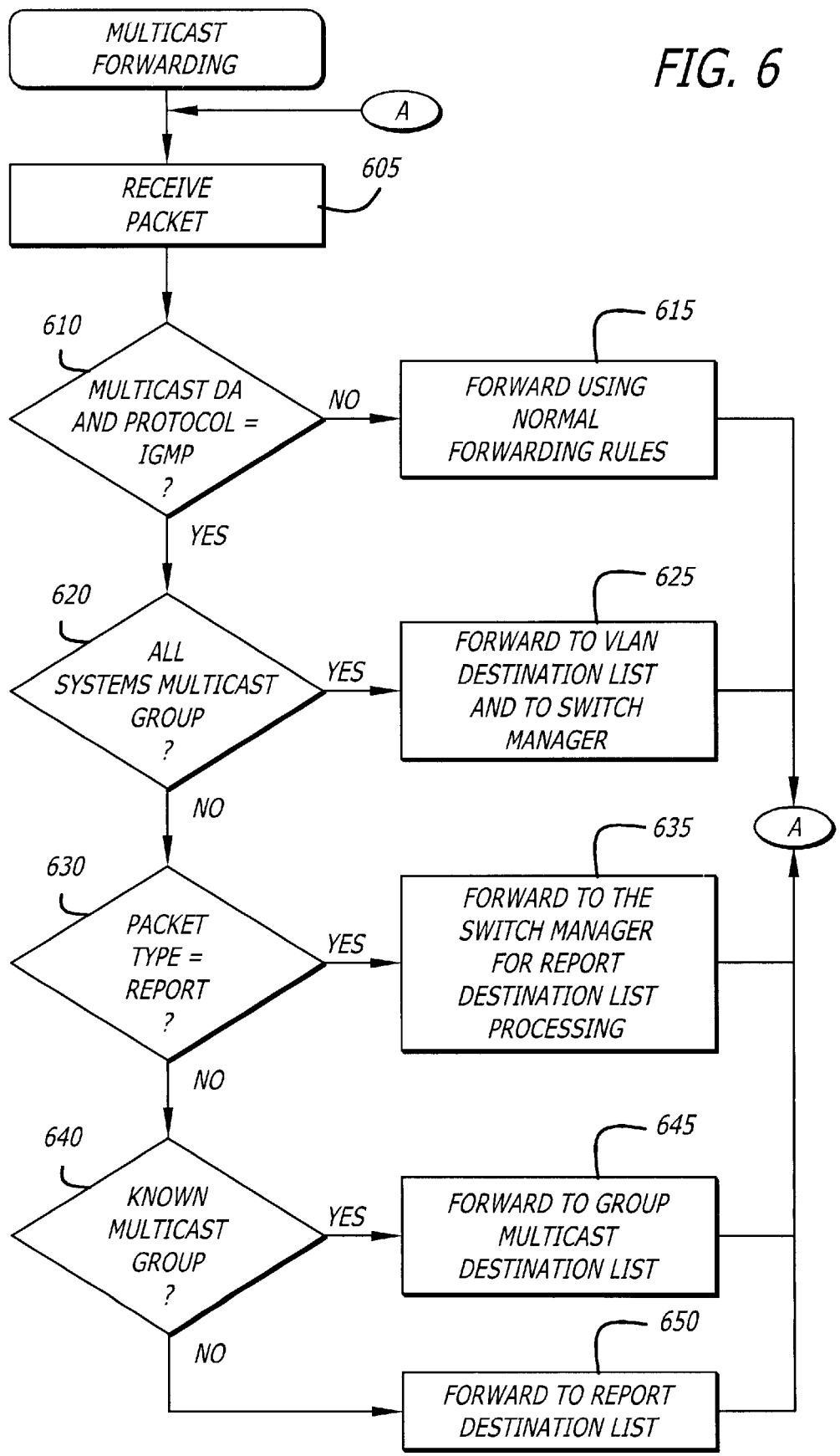
FIG. 6 is a flow diagram illustrating a method of forwarding multicast packets according to one embodiment of the present invention.

FIG. 6 is a flow diagram illustrating a method of forwarding multicast packets according to one embodiment of the present invention. A packet is received by the switch at step 605. At step 610, the forwarding engine of the switch evaluates the destination address of the packet and the protocol identified in the packet. If the destination address is a multicast group address and if the protocol is IGMP, then the flow continues to step 620. Otherwise, if the destination address is not a multicast group address or if the protocol is not IGMP, then the flow branches to step 615.

At step 615, the packet is forwarded using normal forwarding rules.

At step 620, the forwarding engine determines the multicast group. If the multicast group is the all-systems multicast group (i.e., 224.0.0.1), then the flow follows the "yes" path to step 625. Otherwise, if the multicast group is not the all-systems multicast group, then the flow continues with step 630.

At step 625, it has previously been determined by step 620 that the packet is addressed to the all-systems multicast group, thus, the packet is forwarded to the ports in the VLAN destination list and to the switch manager 320.

At step 630, the forwarding engine determines if the type field of the IGMP message indicates the messages is an IGMP membership report. If the packet type is report, then the flow branches to step 635. However, if the packet type is other than report, the flow continues with step 640.

At step 635, the IGMP membership report is forwarded to the switch manager 320 for report destination list processing. The switch manager 320 may simply forward the report onto the report destination list thereby forwarding the report to all ports having either a querier or a non-querier device. Alternatively, the switch manager 320 may be functioning as a proxy and suppress the forwarding of some reports as will be discussed further below.

At step 640, the forwarding engine determines if the group address in the IGMP message is a known IP multicast group. The group address is known, for example, if it can be found in the forwarding table, meaning at least one end-station has subscribed to the IP multicast group. In this example, if the group address is found in the forwarding table, then the flow continues with step 645.

At step 645, the multicast packet is forwarded onto the appropriate group multicast destination list by retrieving the group multicast destination list or corresponding Dtag from the forwarding table, for example.

Returning to step 640, if the group address is not found in the forwarding table, then the flow continues with step 650. At step 650, the multicast packet is forwarded to all ports coupled to multicast routers using the report destination list. This behavior ensures IP multicast group members on other networks will be receive packets addressed to their IP multicast group.

Proxying of IGMP Membership Reports

As discussed above, once per-port IP multicast pruning is implemented within a switch, all end-stations participating in an IP multicast group are forced to produce membership reports. Normally, these reports are forwarded to the multicast router for the subnetwork. This implies that the router has to process as many IGMP membership reports, for example, as there are participants in a given multicast group on that subnet. Processing multicast group membership reports such as IGMP membership reports is often computationally expensive for the router. Therefore, to prevent detrimental effects on router performance, it is desirable to have switches act as a proxying devices for IGMP membership reports to reduce the number of IGMP membership reports that must be processed by the multicast routers.

Figure 7:
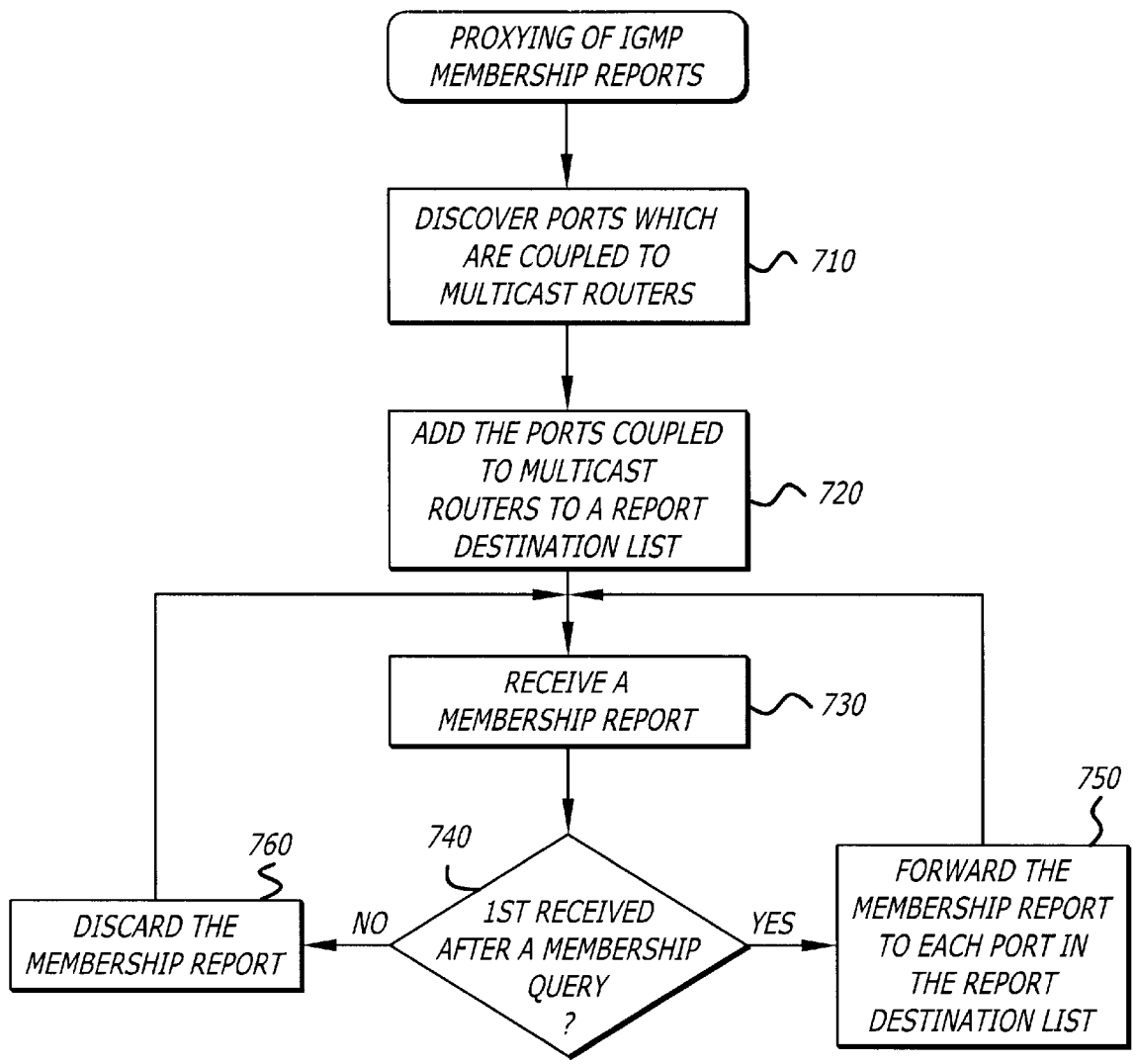
FIG. 7 is a flow diagram illustrating a method of proxying IGMP membership reports according to one embodiment of the present invention.

FIG. 7 is a flow diagram illustrating a method of proxying IGMP membership reports according to one embodiment of the present invention. At step 710, the switch discovers which ports are coupled to multicast routers. This switch can detect multicast routers automatically or the ports on which multicast routers can be manually entered by an operator or a network administrator. The switch can automatically detect querier multicast routers by listening for IGMP membership queries, for example. However, non-querier multicast routers need to be manually entered if they are to receive IGMP membership reports. Otherwise, the port to which the non-querier was coupled would time-out when no IGMP membership queries were received.

At step 720, the ports discovered in step 710 are added to the report destination list.

At step 730, an IGMP membership report is received by the switch. The IGMP membership report might be in response to an earlier IGMP membership query sent by a querier device or it might be unsolicited.

In this embodiment, rather than simply forwarding all IGMP membership reports to the ports containing multicast routers, the switch forwards IGMP membership reports to the switch manager 320. The switch manager 320, at step 740, determines if the IGMP membership report is the first received for the multicast group being reported since the last IGMP membership query was received. The switch manager 320 can accomplish this, for example, by maintaining a "first-report" flag per multicast group on the switch or by other means such as maintaining a counter. Assuming a flag mechanism is used, when an IGMP membership query is received the flag can be set to a state indicating the first report for the group has not been sent. Accordingly, once an IGMP membership query has been forwarded for a given multicast group, the flag should be set to a state indicating the first report has been sent. It may be also be useful to include a timer to toggle the flag should a membership query become lost. Regardless of the mechanism employed, if the IGMP membership report is the first received for the multicast group being reported, then processing continues with step 750. Otherwise, processing continues at step 760.

At step 750, the IGMP membership report is forwarded to each port in the report destination list. This proxying process can be repeated beginning with step 730.

At step 760, since an IGMP membership report for this multicast group has already been forwarded to the ports coupled to multicast routers, the IGMP membership report can be ignored (e.g., discarded or dropped). The process can be repeated starting with step 730. Note that the switch manager 320 will continue to discard IGMP membership reports for a previously reported multicast group until the next IGMP membership query is received by the switch.

In this manner, neighboring multicast routers can update their local tables that track IP multicast groups by processing only a single IGMP membership report per IP multicast group on the attached network. Advantageously, the multicast routers are protected from having to process large numbers of IGMP membership reports that might otherwise have a detrimental effect on their performance.

In an alternative embodiment, it is appreciated that a switch can periodically query each of its ports and forward one membership report per IP multicast group represented. After discovering which ports are coupled to multicast routers, the switch can independently query its ports rather than waiting for further membership queries.

Pseudo-IGMP Query Generation

Figure 1B:
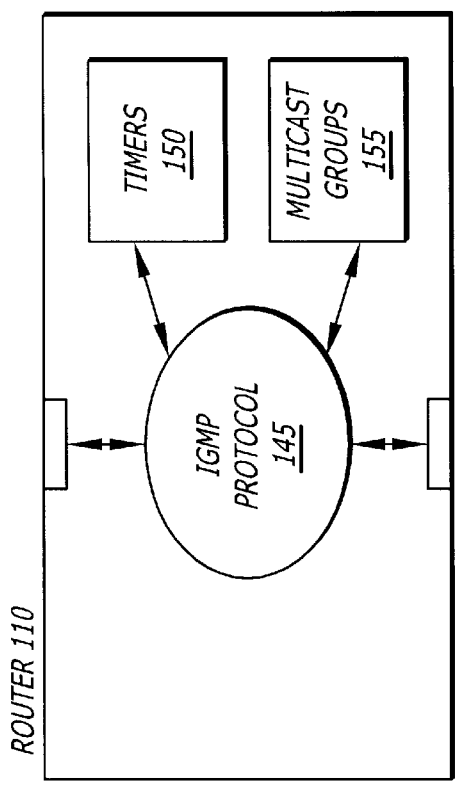
FIG. 1B is a block diagram of the multicast router of FIG. 1A.
Figure 1C:
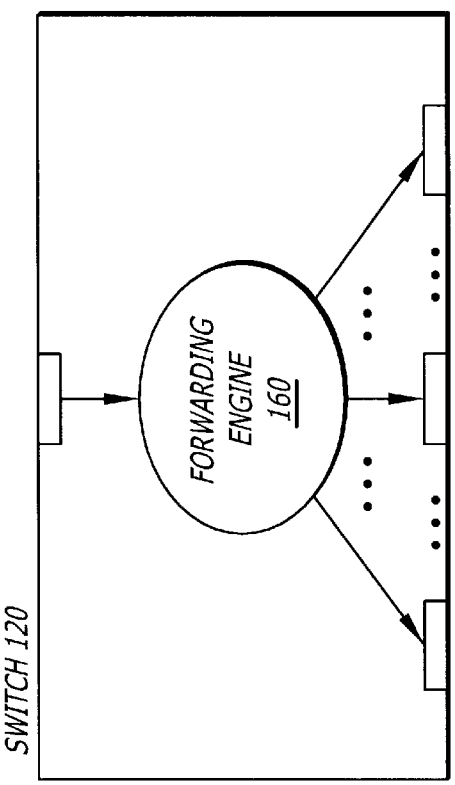
FIG. 1C is a block diagram of the switches of FIG. 1A.
Figure 1A:
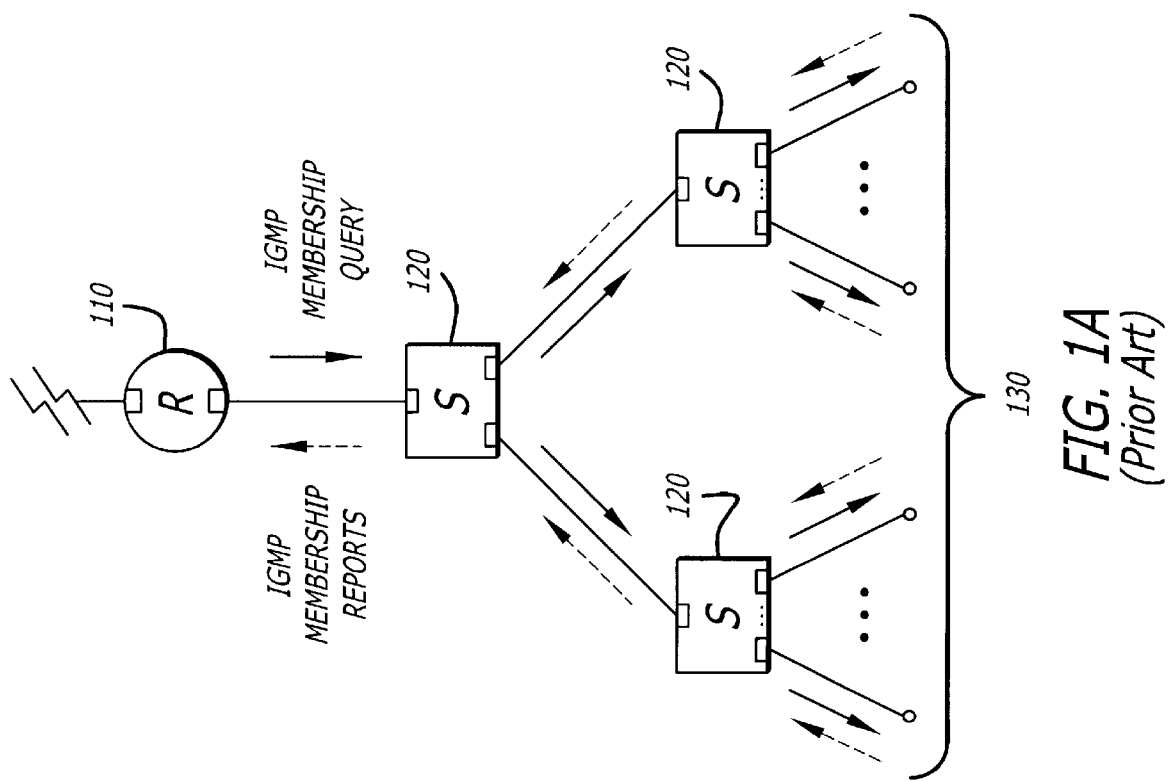
FIG. 1A illustrates how a multicast router determines multicast group membership.

The prior pruning approach discussed with respect to FIGS. 1A through 2 is limited to networks including routers that support multicast routing. That is, one or more multicast routers must be present and additionally multicast routing must be enabled. When no multicast routers are present on the network or when multicast is otherwise disabled, it is desirable to continue to provide the ability to perform IP multicast pruning on a per-port basis within a switch. Therefore, it would be advantageous for a switch to detect the absence of a querier device and initiate IGMP membership queries of its own. The rest of the switches on the network can then use the IGMP membership reports triggered by the "pseudo-IGMP queries" to build local maps of IP multicast groups to ports as described above. These maps can then be used to control forwarding of multicast traffic within a subnet.

Figure 8:
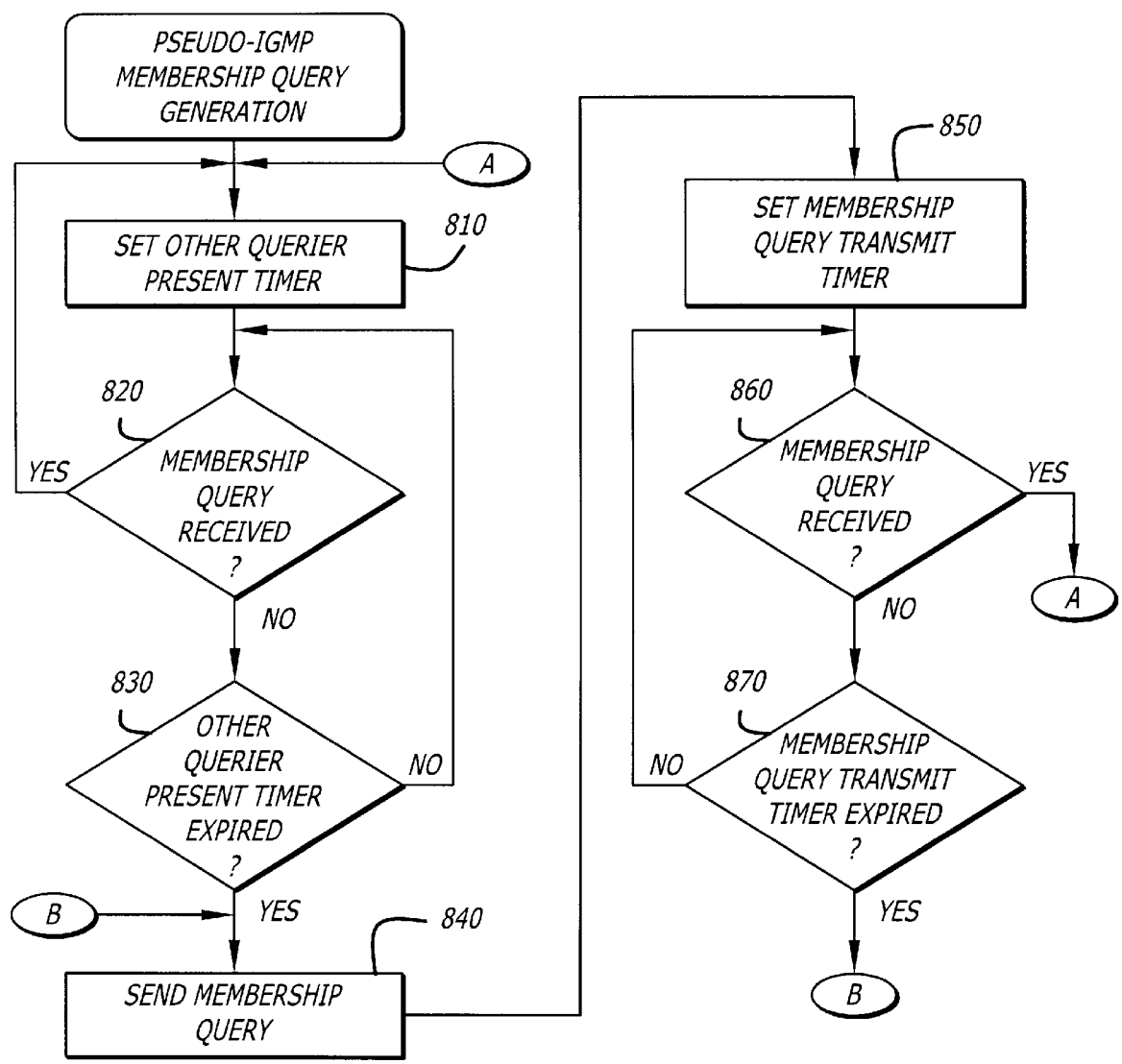
FIG. 8 is a flow diagram illustrating a method of pseudo-IGMP membership query generation according to one embodiment of the present invention.

FIG. 8 is a flow diagram illustrating a method of pseudo-IGMP membership query generation according to one embodiment of the present invention. This is accomplished by each switch performing the following steps.

Steps 810 through 830 represent a state in which the switch is a non-querier. In this state, the switch waits until it determines that no querier device is present on the network. Upon determining that no querier device is present, however, the switch enters a second state and begins originating IGMP membership queries of its own.

At step 810, the switch sets the other querier present timer. As indicated above, the other querier present timer is the length of time required to make a determination as to whether or not a querier device is present. Importantly, to prevent the situation in which multiple switches may have the same timer value, each switch adds a random value to the other querier present timer. If an IGMP membership query is received (step 820) prior to the expiration of the other querier present timer (step 830), then processing continues with step 810, where the timer will be reset.

At step 830, if the other querier present timer has expired and no IGMP membership queries have been received, then processing continues with step 840. However, while the timer remains active, processing loops back to step 820.

Steps 840 through 870 represent a state in which the switch has assumed the role of a querier device. In this state, the switch will periodically transmit IGMP membership queries on each of its ports until the switch hears an IGMP membership query.

At step 840, the switch sends IGMP membership queries over each port.

At step 850, the switch sets a membership query transmit timer. This timer represents the amount of time which must pass before a port is removed from the group destination lists. Essentially, if the timer expires and no IGMP membership reports have been received on a given port, it is assumed no multicast group members are on that port.

At step 860, if an IGMP membership query has been received then the switch resumes the non-querier state and processing continues with step 810. However, if no IGMP membership queries have been received processing continues as step 870.

At step 870, if the membership query transmit timer has expired, then it is time to send IGMP membership queries again and processing continues to step 840. Otherwise, while the timer is active, processing loops back to step 860 until either an IGMP membership query is detected or the timer expires.

Figure 9:
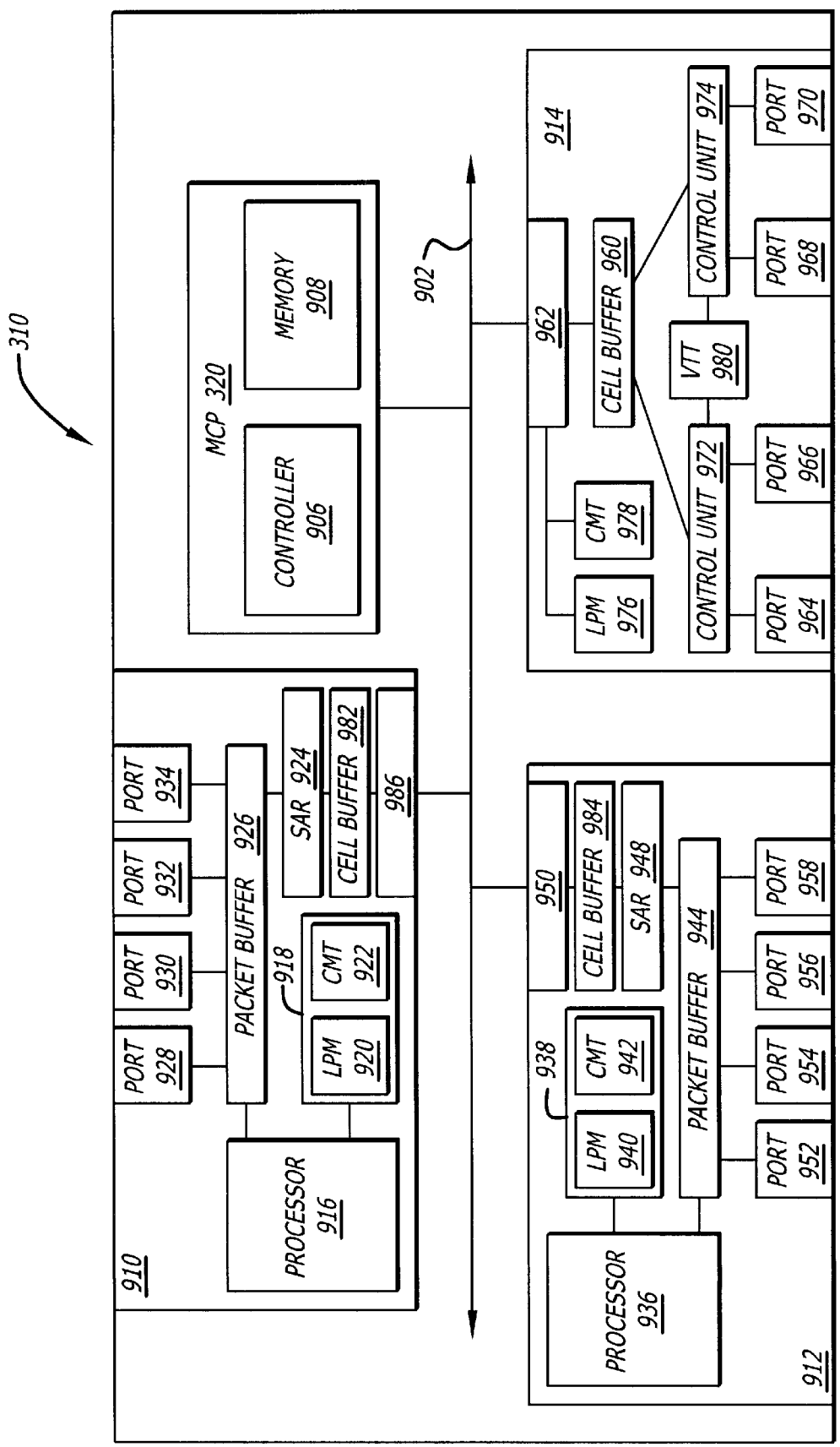
FIG. 9 illustrates a switching device according to an embodiment of the invention.

Referring to FIG. 9, it illustrates a switching device 310 according to one embodiment of the invention. Switching device 310 includes a common backplane 902 to which multiple switching interface cards may be connected. While in the illustrated embodiment the common backplane 902 is an ATM cell switching backplane, the present invention is not limited to any particular type of backplane. In any event, the switching interface cards do not themselves have to be ATM interface cards. Any type of network interface card may used as long as circuitry is provided for converting data from the format supported by the interface cards to the format supported by the common backplane 902. Further, any number and combination of interface cards may be present, including token ring, ATM, FDDI and serial WAN interface cards. In the illustrated embodiment, two token ring interface cards 910 and 912 and one ATM interface card 914 are connected to the common backplane 902 in switching device 310.

Because backplane 902 is an ATM backplane, in this embodiment, all data moving over the backplane 902 is in the form of ATM cells. All packet data received by non-ATM interface cards, such as token ring interface cards 910 and 912, must be segmented into cells when entering the backplane 902 and re-assembled into packets when leaving the backplane 902 for packet transmission.

Consequently, token ring interface cards 910 and 912 include circuitry for performing segmentation and reassembly. Specifically, cards 910 and 912 respectively include packet buffers 926 and 944 connected to their respective ports. Both incoming and outgoing packets are temporarily stored these packet buffers.

If a packet received from an external source is to be transmitted to one or more ports on one or more other interface cards, then a Segmentation And Reassembly circuit (SAR) encapsulates the data from the packet into ATM cells, which are then stored in a cell buffer. Similarly, data received from other cards is encapsulated in ATM cells. Packet-based cards, such as token ring interface cards 910 and 912 must extract the appropriate information from the cells, which are stored in the cell buffer, and encapsulate the data in a packet constructed in the packet buffer.

Cards 910 and 912 respectively include SARs 924 and 948 which are respectively connected between packet buffers 926 and 944 and cell buffers 982 and 984. Cell buffers 982 and 184 are respectively coupled to backplane 902 through backplane interfaces 986 and 950. In the illustrated embodiment, processing is performed on cards 910 and 912 by processors 916 and 936 respectively. Processors 916 and 936 are respectively coupled to memory 918 and 938.

The data received by ATM card 914 from external sources is encapsulated in the form of ATM cells. Consequently, ATM card 914 does not need to perform packet-to-cell conversions prior to sending data over ATM backplane 902 to other cards within device 310. ATM card 914 includes control units 972 and 974 coupled between its ports and a cell buffer 960. A VTT 980 is coupled between control unit 972 and control unit 974. The cell buffer 960 is coupled to the ATM backplane 902 through an interface 962.

Switching device 310 includes a master control process (MCP) 320 for controlling the flow of information within switching device 310. The data transfers that occur between interface cards within switching device 310 included three general types of traffic. Data that is sent between packet switching interfaces (e.g. data sent from token ring interface card 910 to token ring interface card 912) is referred to as LAN-to-LAN traffic. Data that is sent between a packet switching interface and a cell switching interface (e.g. data sent from token ring interface card 910 and ATM interface card 914) is referred to as LAN-to/from-ATM traffic. Data that is sent between two cell switching interfaces is referred to as ATM-to-ATM traffic.

MCP 320 includes a controller 906 and a memory 908. Memory 908 stores a plurality of tables, including a master destination tag ("Dtag") table that shall be described hereafter. Controller 906 generally represents control circuitry used to construct and maintain the tables within memory 908, and to control the flow of data within device 310 based on those tables. Controller 906 may be implemented with hard wired circuitry, or by causing a processor to execute instructions. The present invention is not limited to a particular implementation of controller 906. Further, MCP 320 is illustrated separate from cards 910, 912 and 914 for the purposes of explanation. However, MCP 320 may actually reside on one of the interface cards, or be distributed among the various interface cards.

Destination Tags

MCP 320 uses Dtags to control the distribution of data within and between each of the cards in device 310, and between ports on each of the cards. Data flow management primarily involves the routing of cells over the backplane 902 and between ports, and the control of segmentation and re-assembly of packets to and from cells. Controls are provided for the stripping and adding of appropriate encapsulation headers during both segmentation and re-assembly to provide standardized formatting of packet data over cell based networks.

In the preferred embodiment, Dtags are twelve bit values. By convention, the four high order bits for Dtags used for point-to-point forwarding are zero. The second four bits in a point-to-point Dtag specify the destination card and the low order four bits specify the destination port on the specified destination card. The Dtags for point-to-point forwarding are pre-allocated upon the initialization of switch device 310. This convention is arbitrary. In some embodiments it may simplify recognition of the direct single port Dtags.

For operations in which data is sent to multiple ports (multicast operations), at least one of the first four bits is non-zero. These multicast Dtags and their associated table entries are allocated after initialization as needed to represent the virtual architecture of the switching device 310. In the preferred embodiment, special Dtags are also allocated for transmitting messages to MCP 320.

A Dtag is used as an index to tables that provide the necessary information to allow the various components within the switch device 310 to deal with the forwarding and management of packet/cell data flows. As mentioned above, MCP 320 maintains a master Dtag table within the memory 908. According to one embodiment, each entry within the master Dtag table has the form illustrated by entry 1000 in FIG. 10. Specifically, each Dtag entry includes a destination mask 1010, a priority value 1014, a destination VPI/VCI value 1016, a source strip/insert control field 1018, and a destination strip/insert control field 1020.

Each port on each card within device 310 is represented by one bit within destination mask 1010. The bit that corresponds to a port is set if the port is a destination port for data associated with the Dtag entry. In the preferred embodiment, all ports on a given interface card correspond to contiguous bits within the destination mask 1010. Consequently, it may be quickly determined whether data associated with a particular Dtag entry should be sent to a particular card by performing an OR operation on the bits within destination mask 1010 that correspond to the ports on the card.

Priority value 1014 indicates the priority level to be used when transmitting data to the destination ports designated in the Dtag entry. The destination VPI/VCI value 1016 is used for ATM cells that are sourced on an ATM card or sent from an ATM card. Since the destination for a packet received by a LAN card may be an ATM port on an ATM card, there must be a place to carry the destination VPI/VCI value. The destination VPI/VCI value 1016 stores the information necessary for this case.

As mentioned above, packets must be converted to cells when data received by a LAN card is sent to any other card over ATM backplane 902. The source strip/insert control field 1018 includes control data used to construct the appropriate cell headers during the segmentation process. When a LAN card receives cells over ATM backplane 902 from another card, the LAN card must reassemble that data contained in the cells into a packet. The destination strip/insert control information 1020 includes control data used to construct the appropriate packet headers during the reassembly process.

Routing Withing Device 310

Controller 906 creates a unique Dtag entry in the master Dtag table contained in memory 908 for each destination or combination of destinations. Each entry in Dtag table has a unique index. The indexes to the entries in the master Dtag table are referred to as Dtags. These same Dtags are also used to index other tables that shall be described hereafter. As shall be explained hereafter, Dtags and the tables indexed thereby are the primary mechanisms for routing data within device 310.

In the illustrated example, token ring card 910 includes four ports 928, 930, 932 and 934, token ring card 912 includes four ports 952, 954, 956 and 958, and ATM card 914 includes four ports 964, 966, 968 and 970. Data received by any of the interface cards within device 310 may be destined for any one of the ports on any one of the interface cards. Consequently, the master Dtag table preferably contains one entry for each of the ports on each of the interface cards. The destination mask 1010 in the Dtag entry that corresponds to a given port would have the bit that corresponds to the port set.

In addition to switching from and to a single port, data received at one port may be destined for more than one other port. For example, packets may arrive at port 928 that are to be transmitted out through ports 930, 952 and 954. To support such one-to-many transfers, a Dtag entry is constructed for each desired unique set of destination ports. Typically, Dtag entries are not constructed for every possible unique set of destination ports, since the number of possible combinations may be extremely high. Rather, Dtag entries are constructed for every unique set of destination ports for which there is a reason to send data to the ports as a set (e.g. the set of ports that belong to a virtual token ring). To support the transfer described in the above example, a Dtag entry would be constructed in which the bits of the destination mask 1010 that correspond to ports 930, 952 and 954 would be set.

Destination Designations

When data is received by an interface card within device 310, the data will contain some indication as to where the data is to be sent. The type of destination information will vary based on the type of message that contains the data and type of network from which the data was received. For example, a packet received at port 928 of token ring interface card 910 may designate a destination with a MAC address. In contrast, cells received at port 964 may designate a destination with a VCI value.

Rather than attempt to route information between interface cards by directly using these various incompatible types of destination designations, the present invention uses the destination designations to determine the appropriate Dtag for a particular block of data, and routes all data within device 310 based on the Dtag.

To determine the Dtag appropriate for a particular block of data, controller 906 constructs and maintains tables within memory 908 in addition to the master Dtag table. In the preferred embodiment, the tables used to determine the Dtag appropriate for incoming data include a VCI-to-Dtag table that establishes a correspondence between VCI values and Dtags, a LTR-to-Dtag table that establishes a correspondence between virtual token rings and Dtags, and a GA-to-Dtag table that establishes a correspondence between group addresses and Dtags.

It should be noted that the tables described herein may contain fields in addition to those mentioned. For example, each entry in the VCI-to-Dtag table may include a reassembly ID value and a quality of service value. The LTR-to-Dtag table may include a ring number. The present invention is not limited to any particular set of tables or fields.

Centralized Routing

According to one embodiment, controller 906 controls all routing within device 310 based on the tables described above. In such an embodiment, when an interface card receives data, the interface card transmits the destination designation for the data over backplane 902 to controller 906. Controller 906 uses the destination designation as in index to a table to determine the appropriate Dtag for received data. For example, if the destination designation indicated a particular VCI value, then the VCI value would be used as an index to the VCI-to-Dtag table to determine the appropriate Dtag.

Once the appropriate Dtag is determined, the Dtag is used as an index to the master Dtag table to determine the appropriate Dtag entry. The data contained in the Dtag entry is used to determine the cards and ports to which the data must be sent over backplane 902. Cells containing data that indicates the cards and ports to which the data must be sent is communicated over backplane 902 to the interface card which received the data. The interface card then begins transferring the data to the appropriate interface cards over backplane 902.

In an embodiment where all of the Dtag information is only contained in a central location such as the embodiment described above, much of the bandwidth of backplane 902 is used simply for communications between MCP 320 and the various interface cards. To avoid such inefficient use of the backplane 902, the preferred embodiment distributes the information contained in the tables stored in memory 908 to the various interface cards.

Decentralized Tables

According to the preferred embodiment, controller 906 transmits information over backplane 902 to the various interface cards to cause the cards to build their own internal tables. The tables contained in each card include tables for determining the Dtags for all data that the card may receive from external sources, and tables indexed by the Dtags for determining the cards and ports to which the data must be sent.

The tables used to determine the Dtags for data received from outside sources may include locally stored versions of the VCI-to-Dtag table, LTR-to-Dtag table and/or GA-to-Dtag table described above. Tables indexed by the Dtags for determining the cards and ports to which the data must be sent may include a locally stored version of all or a portion of the master Dtag table. However, in the preferred embodiment, information from the master Dtag table is used to create two locally stored tables. This embodiment is illustrated in FIG. 9.

Specifically, cards 910, 912 and 914 respectively include Local Port Mask tables (LPMs) 920, 940 and 976 and Card Mask Tables (CMTs) 922, 942, and 978. LPMs 920, 940 and 976 are tables, indexed by Dtags, which indicate which of the local ports on the card are destination ports for a given Dtag. For example, assume that the Dtag "DTAG1" is the index for an entry in the master Dtag table whose destination mask 1010 designates ports 928, 952 and 954 as destination ports. LPM 920 would have a corresponding entry, indexed by DTAG1, that designates that port 928 is a destination port.

CMTs 922, 942 and 978 are tables, indexed by Dtags, which indicate which of the other interface cards within device 310 should be sent data that is associated with a given Dtag. Using the DTAG1 example given above, CMT 922 would have an entry, indexed by DTAG1, that designates interface card 912 as a destination card. Interface card 912 is a destination card for data associated with DTAG1 because ports 952 and 954, which are destination ports for DTAG1, reside on interface card 912.

Continuing with the DTAG1 example, LPM 940 in interface card 912 would contain an entry, indexed by DTAG1, which designates ports 952 and 954 as destination ports. CMT 942 in interface card 912 would contain an entry, indexed by DTAG1, which designates interface card 910 as card to which data associated with DTAG1 must be sent. In ATM interface card 914, the entry in LPM 976 indexed by DTAG1 would not designate any local ports as destination ports. The entry in CMT 978 indexed by DTAG1 would designate both interface cards 910 and 912 as cards to which data associated with DTAG1 must be sent.

A LPM entry for a given Dtag may be easily constructed from the Dtag entry in the master Dtag table for the Dtag. Specifically, for each interface card, the LPM entry for a Dtag includes those bits within the destination mask 1010 field that correspond to the ports on the interface card.

Figures 10, 11:
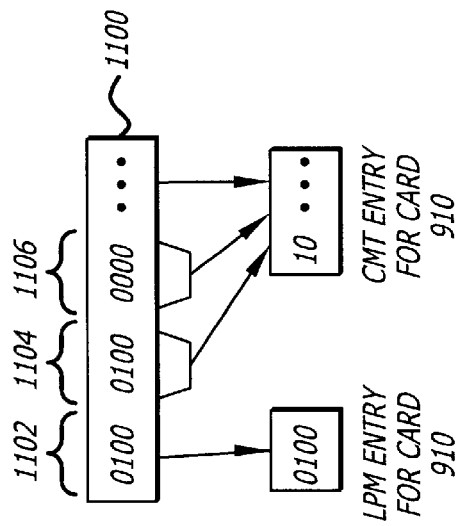
FIG. 10 illustrates an entry in a master destination tag table according to an embodiment of the invention.
FIG. 11 illustrates how information for constructing locally stored tables is derived from the destination mask field in the master destination tag table.

Referring to FIG. 11, the destination mask 1010 of an exemplary Dtag entry is illustrated. The bits in destination mask 1010 correspond to ports 928, 930, 932, 934, 952, 954, 956, 958, 964, 966, 968 and 970 respectively. Of these bits, the bits indicated by 1102 correspond to the ports on card 910. Consequently, for card 910, the LPM entry for the Dtag in question includes the bits indicated by 1102.

A CMT entry for a given Dtag may also be easily constructed from the entry in the master Dtag table that corresponds to the Dtag. Specifically, each CMT entry includes one bit for each interface card within device 310 other than the interface card on which the particular CMT is stored. The bit that corresponds to a given interface card is set if any one of the bits in the destination mask 1010 that correspond to the ports on the given interface is set.

Referring again to FIG. 11, the bits indicated by 1104 correspond to ports on card 912, and the bits indicated by 1106 correspond to ports on card 914. The CMT entry in card 910 for the Dtag in question includes one bit for each card other than card 910 that is present in device 310. The bit that corresponds to a card is set in the CMT entry if any bits that correspond to the ports on the card are set in the destination mask. In the illustrated example, at least one of the bits 1104 that correspond to ports on card 912 is set, so the bit corresponding to card 912 in the CMT entry is set. None of the bits 1106 that correspond to ports on card 914 are set, so the bit corresponding to card 914 in the CMT entry is not set.

Decentralized Routing

The tables described above are stored locally on the various interface cards so that intra-card and inter-card routing control functions may be performed locally within the cards rather than through the intervention of the MCP 320. Specifically, when any interface card within device 310 receives data from an external source, the destination address of the data (IEEE MAC address for token ring interface cards, VPI/VCI for ATM cards) is used to determine the appropriate Dtag for the data. As mentioned above, the correspondence between the various types of destination addresses and Dtags are stored in tables maintained locally within each interface card. Consequently, the Dtag for a particular block of received data may be determined by the receiving interface card without any additional communication with MCP 320.

Once the Dtag for the received block of data has been determined, the interface card determines where the data must be sent. Specifically, circuitry on the interface card, such as processor 916, uses the Dtag as an index to the locally stored LPM to determine whether the data is to be sent out on a local port, and as an index to the locally stored CMT to determine whether the data is to be sent over backplane 902 to one or more other interface cards.

If the LPM entry corresponding to the Dtag indicates that the received data is to be sent out on one or more local ports (other than the port on which the data arrived), the interface card sends the data to the specified local ports. If the CMT entry corresponding to the Dtag indicates that the data is sent to one or more other cards in device 310, then the data is placed on backplane 902. In the preferred embodiment, the card mask from the CMT entry is placed on the backplane 902 prior to placing the data on the backplane. Each card in device 310 reads the card mask to determine whether it should read the subsequent data.

If the data was received by a LAN card, then the data must be packaged into cells prior to placing the data on backplane 902. This process typically requires stripping some information from the packets and adding additional information to encapsulate the data into ATM cells. This operation is performed by the SAR unit within the LAN card based on control information stored in one or more locally maintained tables. The entries for such tables are constructed based on the source strip/insert control field 1018 in the master Dtag table.

If the data was received by an ATM card, then the data is already in the cell format. However, control information must still be placed in the cells to designate the Dtag associated with the cells prior to placing the cells onto the backplane 902.

In the preferred embodiment, the operation of sending out on one or more ports of a LAN card a packet that arrived on a port of the same LAN card is performed without converting the packet to ATM cells. Consequently, packets that are only between ports on the same LAN card do not have to be segmented, re-assembled, or transferred over backplane 902. This significantly reduces the traffic over backplane 902 while increasing the efficiency of local port-to-port packet transfers.

Cells containing data that is to be transferred from the receiving interface card to one or more other interface cards is placed on the backplane 902 by the interface card that received the data from an external source. As mentioned above, the header for the cells contains data indicating the Dtag associated with the cells. Each interface card inspects the card mask placed on the backplane to determine whether the interface card is a destination interface card for the cell that will follow the card mask. Each card indicated as a destination card by the card mask reads the cell off of backplane 902 and stores the cell in a cell buffer.

For each cell read by an interface card off backplane 902, the Dtag associated with a cell is determined by the cell header information. Once the Dtag has been determined, the Dtag is used as an index to the local LPM table to determine on which local ports the data is to be sent. Once the local ports have been determined, the data is sent to external devices through the specified local ports.

For ATM cards, the data to be sent out on local ports may be sent as cells, so no conversion is necessary. However, for LAN cards, the data from the cells must be re-assembled into packets. The re-assembly process typically includes stripping some information from the cells, and adding information to create a packet. The information to strip and/or add for any given re-assembly operation is determined with reference to one or more locally stored tables. Such tables include the information from the destination strip/insert control 1020 field of the master Dtag table. Once the packets have been reassembled, they are sent out through the designated ports.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of forwarding packets received by a switch, the switch including a plurality of ports, the switch coupled to a plurality of end-stations, one or more of the plurality of end-stations being part of a virtual local area network (VLAN), the method comprising:

maintaining a mapping of Internet Protocol (IP) multicast groups to one or more of the plurality of ports;

causing at least one member of an IP multicast group on each LAN segment of the VLAN to respond to a group membership query message with a group membership report by suppressing the forwarding of group membership reports onto the VLAN;

receiving an IP multicast packet;

forwarding the IP multicast packet to each of the one or more end-stations in the VLAN if a destination address associated with the IP multicast packet is an all-systems multicast group;

forwarding the IP multicast packet to only those of the plurality of ports that are coupled to IP multicast routers if the IP multicast packet is a group membership report or if the destination address is one that is not known by the switch; and forwarding the IP multicast packet to one or more end-stations of the plurality of end-stations if the destination address is one that is known by the switch to be an IP multicast address subscribed to by the one or more end-stations.

2. The method of claim 1 wherein said forwarding the IP multicast packet to each of said one or more of said plurality of end-stations in the VLAN is accomplished by forwarding the IP multicast packet to a VLAN destination list.

3. The method of claim 1 wherein said forwarding the IP multicast packet to only those of the plurality of ports that are coupled to multicast routers is accomplished by forwarding the IP multicast packet to a report destination list.

4. The method of claim 1 wherein said forwarding the IP multicast packet to one or more end-stations of the plurality of end-stations is accomplished by forwarding the IP multicast packet to a group multicast destination list.

5. The method of claim 4 wherein a VLAN destination list includes a list of ports through which the one or more end-stations that are part of the VLAN are coupled to the switch, and wherein the group multicast destination list is a subset of the VLAN destination list.

6. A method of forwarding packets received by a switch, the switch coupled to a querying device and a plurality of end-stations via a plurality of local area network (LAN) segments that are on physically different segments yet in the same broadcast domain, the method comprising:

maintaining a mapping of Internet Protocol (IP) multicast groups to one or more of the plurality of LAN segments by causing at least one of the plurality of end-stations that is a member of an IP multicast group on each of the plurality of LAN segments to respond to a group membership query from the querying device by suppressing the forwarding of group membership reports received on the plurality LAN segments to the other LAN segments, creating a table including multicast destination information for each IP multicast group represented by the plurality of end-stations, the table based upon information specified in the group membership reports and the particular ports on which the group membership reports are received;

receiving an IP multicast message for a particular IP multicast group; and based upon the table, forwarding the IP multicast message onto those of the plurality of LAN segments that include one or more end-stations that are members of the particular IP multicast group.

7. The method of claim 6, wherein the group membership reports comprise Internet Protocol Group Management (IGMP) membership reports, and the group membership query message comprises an IGMP membership query.

8. A machine-readable medium having stored thereon data representing sequences of instructions, the sequences of instructions which, when executed by a processor, cause the processor to:

maintain a mapping of Internet Protocol (IP) multicast groups to one or more of a plurality of ports;

cause at least one member of an IP multicast group on each LAN segment of a VLAN to respond to a group membership query message with a group membership report by suppressing the forwarding of group membership reports onto the VLAN;

receive an IP multicast packet;

forward the IP multicast packet to each of one or more end-stations of a plurality of end-stations that are associated with the same virtual local area network (VLAN) if a destination address associated with the IP multicast packet is an all-systems multicast group;

forward the IP multicast packet to only those of the plurality of ports that are coupled to IP multicast routers if the IP multicast packet is a group membership report or if the destination address is one that is not known; and forward the IP multicast packet to one or more end-stations of the plurality of end-stations if the destination address is one that is known to be an IP multicast address subscribed to by the one or more end-stations.

9. A machine-readable medium having stored thereon data representing sequences of instructions, the sequences of instructions which, when executed by a processor, cause the processor to perform the steps of:

maintaining a mapping of Internet Protocol (IP) multicast groups to one or more of a plurality of local area network (LAN) segments by causing at least one of a plurality of end-stations that is a member of an IP multicast group on each of the plurality of LAN segments to respond to a group membership query from a querying device by suppressing the forwarding of the group membership reports received on the plurality of LAN segments to the other LAN segments, creating a table including multicast destination information for each IP multicast group represented by the plurality of end-stations, the table based upon information specified in the group membership reports and the particular ports on which the group membership reports are received;

receiving an IP multicast message for a particular IP multicast group; and based upon the table, forwarding the IP multicast message onto those of the plurality of LAN segments that include one or more end-stations that are members of the particular IP multicast group.

10. A network device comprising:

a processor; and a memory coupled to said processor, said memory having stored therein sequences of instructions which, when executed by said processor, cause said processor to maintain a mapping of Internet Protocol (IP) multicast groups to one or more of a plurality of ports;

cause at least one member of an IP multicast group on each LAN segment of a VLAN to respond to a group membership query message with a group membership report by suppressing the forwarding of group membership reports onto the VLAN;

receive an IP multicast packet;

forward the IP multicast packet to each of one or more end-stations of a plurality of end-stations that are associated with the same virtual local area network (VLAN) if a destination address associated with the IP multicast packet is an all-systems multicast group;

forward the IP multicast packet to only those of the plurality of ports that are coupled to IP multicast routers if the IP multicast packet is a group membership report or if the destination address is one that is not known; and forward the IP multicast packet to one or more end-stations of the plurality of end-stations if the destination address is one that is known to be an IP multicast address subscribed to by the one or more end-stations.

11. A network device comprising:

a processor; and a memory coupled to said processor, said memory having stored therein sequences of instructions which, when executed by said processor, cause said processor to maintain a mapping of Internet Protocol (IP) multicast groups to a plurality of local area network (LAN) segments on physically different segments yet in the same broadcast domain by causing at least one of a plurality of end-stations that is a member of an IP multicast group on each of the plurality of LAN segments to respond to a group membership query from a querying device by suppressing the forwarding of the group membership reports received on the plurality of LAN segments to the other LAN segments, creating a table including multicast destination information for each IP multicast group represented by the plurality of end-stations, the table based upon information specified in the group membership reports and the particular ports on which the group membership reports are received;

receive an IP multicast message for a particular IP multicast group; and based upon the table, forward the IP multicast message onto those of the plurality of LAN segments that include one or more end-stations that are members of the particular IP multicast group.

* * * * *